United States Patent [19]

Windecker

[11] 4,196,251

[45] Apr. 1, 1980

[54] RIGIDIZED RESINOUS FOAM CORE SANDWICH STRUCTURE

[75] Inventor: Leo J. Windecker, Midland, Tex.

[73] Assignee: International Harvester Company, Chicago, Ill.

[21] Appl. No.: 30,209

[22] Filed: Apr. 16, 1979

[51] Int. Cl.² .................................................. B32B 3/26
[52] U.S. Cl. .................................... 428/311; 156/148; 264/321; 428/102; 428/313; 428/314
[58] Field of Search ................... 428/86, 95, 102, 103, 428/119, 234, 235, 238, 239, 251, 252, 292, 293, 300, 314, 310, 311, 313, 315; 156/148; 264/321

[56] References Cited

U.S. PATENT DOCUMENTS

| | | | |
|---|---|---|---|
| 2,692,219 | 10/1954 | Slayter et al. | 428/102 |
| 3,193,438 | 7/1965 | Schafer | 428/315 |
| 3,269,887 | 8/1966 | Windecker | 428/311 |
| 3,451,885 | 6/1969 | Klein | 156/148 |
| 3,534,852 | 10/1970 | Posner | 428/300 |
| 3,655,471 | 4/1972 | Healy et al. | 156/148 |
| 3,944,704 | 3/1976 | Dirks | 428/311 |

Primary Examiner—William J. Van Balen
Attorney, Agent, or Firm—John P. O'Brien; F. David AuBuchon

[57] ABSTRACT

An improved rigidized resinous foam core sandwich structure is formed by the following method:

Threading a length of high tensile strength fiber through the fiber glass sheets placed contiguous the opposite longitudinal faces of a flexible open-celled foam sheet and through the foam sheet in a manner to provide a continuous series of fiber segments which interconnect the fiber glass sheets;

Impregnating the flexible open-celled foam sheet and the fiber glass sheets with a settable resin containing a curing agent; and Molding the foam core sandwich into the desired shape and holding it in place while the resin cures.

27 Claims, 3 Drawing Figures

RIGIDIZED RESINOUS FOAM CORE SANDWICH STRUCTURE

BACKGROUND OF THE INVENTION

This invention relates to foam core sandwich structures which are useful in the preparation of light-weight articles. In particular, this invention relates to flexbile foam resins having open-cells impregnated with a settable resin and outer skin layer bonded to the opposite longitudinal faces of the foam to form a rigidized foam core sandwich having structural skins.

In my prior U.S. Pat. No. 3,269,887, I disclose a flexible open-celled foam which when impregnated with a resinous material hardens after a brief interval to produce a tough, rigid, foam core having a skin bonded to its opposite longitudinal faces. Such a rigidized resinous foam core sandwich has considerable strength and resistance to failure when loads are applied over an extended area. However, a rigidized resinous foam core sandwich is subject to failure by buckling of the skin upon the part being compressed by either edge loading or bending. This invention discloses an improvement to prior art resinous foam core sandwich structures that greatly increases the amount of compression which may be applied either by column loading or bending.

SUMMARY OF THE INVENTION

My invention is directed to a method of forming a rigidized resinous foam core sandwich structure comprising the steps of:

a. Inserting a plurality of fiber segments through the thickness of the flexible open-celled foam and through thin skins contiguous to the opposite longitudinal faces of the foam in a manner that each fiber segment defines a loop configuration having two closely spaced, generally parallel portions extending through the skins and between the foam's longitudinal faces and having its closed end portion extending beyond one of the skins to define an aperture;

b. Threading a length of fiber through each of the fiber segment's apertures;

c. Impregnating the flexible open-celled foam with a settable resin containing a curing agent therefor; and d. Molding the foam core sandwich into the desired shape and maintaining this shape while the resin cures.

BRIEF DESCRIPTION OF THE DRAWING

For a better understanding of this invention, reference may be made to the drawing in which.

DESCRIPTION OF THE PREFERRED EMBODIMENT

Figure 1:
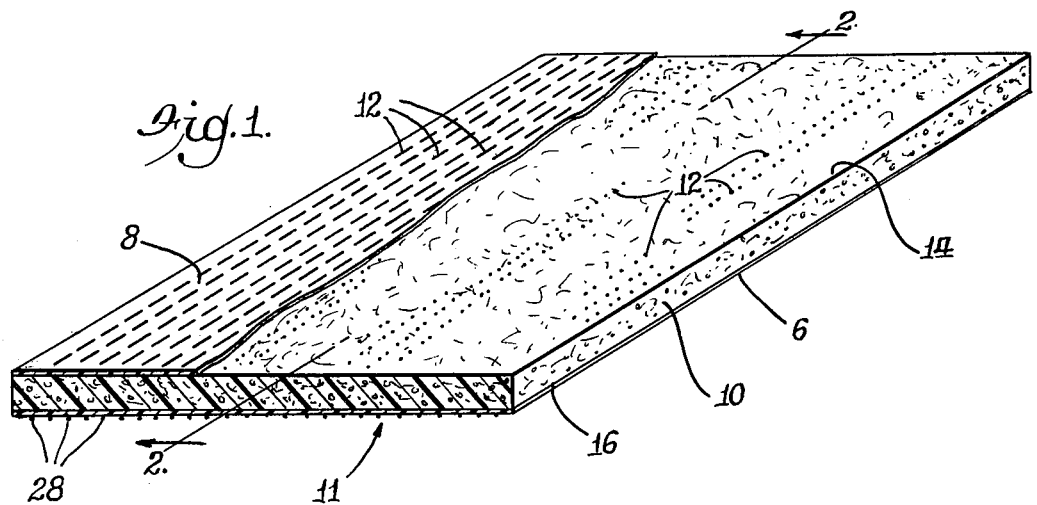
FIG. 1 is a front perspective view of a flexible open-celled foam core sandwich between fibrous skins through which a length of fiber has been threaded to form a continuous series of fiber segment stitches.

Referring to FIG. 1 there is shown a sheet of flexible foam 10. The flexible foam may be any of the commercially available materials such as flexible polyurethane, sponge rubber, cellulose foams, ATC. The foam should have 50 to 85% open-cells to facilitate impregnation with the settable resin.

As is well known in the art, sheets of fibrous material 6 and 8 are placed contiguous the opposite longitudinal faces 14 and 16 of foam 10 for reinforcement purposes. Fibrous sheets 6 and 8 are typically made of a fiber glass reinforced plastic, although other fibrous materials could be used.

Prior to impregnation of the foam with a settable resin, a length of high tensile strength fiber 12 is threaded through fibrous sheets 6 and 8 positioned contiguous the opposite faces 14 and 16 of foam 10 and through foam 10 to form a continuous series of fiber segment stitches 18. Each of these stitches 18 is formed into a loop configuration having generally parallel sides 20, 22 that extend substantially perpendicular to the faces 14 and 16 and a closed end portion 24 which extends beyond fibrous sheet 8 to define an aperture 26. A second length of high tensile strength fiber 28 is threaded through each of the apertures 26 following the same straight line pattern as provided by the length of fiber 12.

The tensile strength fibers 12 and 28 could be made from a variety of materials, such as glass fibers (types "E" and "S"), aramid fibers, graphite fibers, nylon fibers, polyester fibers, metal fibers and metal strands. A "high tensile strength fiber" includes in addition to polymeric and metal fibers, any fiber, strand or monofilament having a tensile strength of at least 25,000 pounds/square inch.

Sheets 6 and 8 are shown as made of fibrous materials for illustrative purposes only. Any thin skin might be used depending on the desired application, such as metal or wood.

After the stitching operation is complete the flexible open-celled foam core 10 and the fibrous sheets 6 and 8 define a foam core sandwich 11. Foam core sandwich 11 is impregnated with a settable resin containing a curing agent. The foam core sandwich 11 is then molded into a desired shape and while maintaining this shape the resin is allowed to cure. The rigidizing of the foam using a settable resin may be accomplished in several ways known to the art. One such known method is disclosed in my U.S. Pat. No. 3,269,887. Another suitable method is disclosed in U.S. Pat. No. 3,193,438, which issued to K. A. Schafer.

As disclosed in my U.S. Pat. No. 3,269,887, a simple but effective method for impregnating the foam core sandwich 11 is to pass it through a vat containing a resin and then squeeze out the excess resin by withdrawing the foam core sandwich 11 from the vat through a set of pressure rollers. The open-cells of the foam core and fibrous sheets are coated with a thin film of resin which subsequently hardens to produce a light-weight foam core sandwich structure having a rigid cellular resin structure within the flexible foam. The resin film on the outside surfaces of fibrous sheets 6 and 8 bond the ends of the stitches 18 and the second length of fiber 28 to the fibrous sheets 6 and 8. A thin film of resin surrounds the parallel portions 20, 22 of each fiber segment 12 to provide a large number of closely spaced, reinforced high tensile stitches 18 that interconnect the two skins 6 and 8. This multitude of reinforcing fiber segments greatly increases the compressive strength of the rigidized foam core sandwich structure to resist shear and tension failure along the foam-skin interface caused by either column loading or bending of the rigidized foam sandwich 10.

It will be appreciated that the wetting of the flexible foam could be done before the stitching operation. It is then necessary to make sure that the stitching step is completed before the resin starts to set.

As disclosed in my prior U.S. Pat. No. 3,269,887 either epoxy resins or unsaturated polyester resins may be used to impregnate and harden the foam. The hardenable flexible foams prepared according to this invention are useful in fabricating numerous articles having irregular shapes and requiring high strength as well as rigidity.

Figure 3:
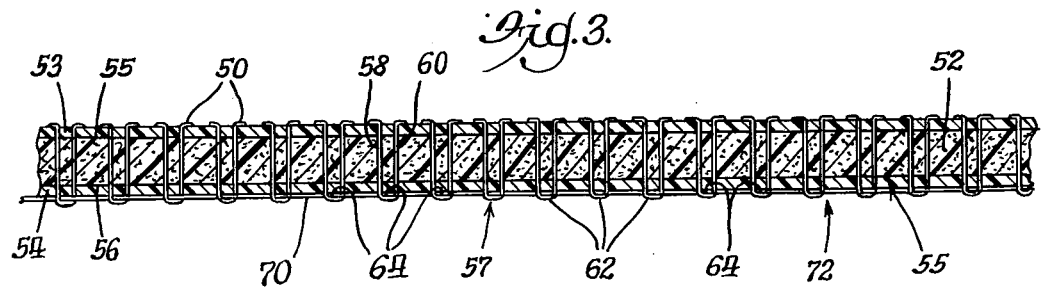
FIG. 3 is an alternative way to provide a plurality of fiber segment stitches through a flexible open-celled foam core sandwich.

An alternative method of producing a plurality of fiber segment stitches is illustrated in FIG. 3. In this figure, there is shown a plurality of short length high tensile strength fiber segments 50 that have been inserted through the width of a flexible foam core 52 and through fibrous sheets 53 and 54 such that their ends extend beyond the fibrous sheets 53 and 54.

Each of these fiber segments 50 comprise a loop configuration having generally parallel leg portions 58, 60 that extend in a generally perpendicular direction relative to the surfaces 54, 56 of flexible foam 52 and an outer closed end portion 62 extending a short distance beyond fibrous sheet 54 to define aperture 64. The other end of leg portions 58 and 60 extend beyond fibrous sheet 53 of flexible foam 52.

Figure 2:
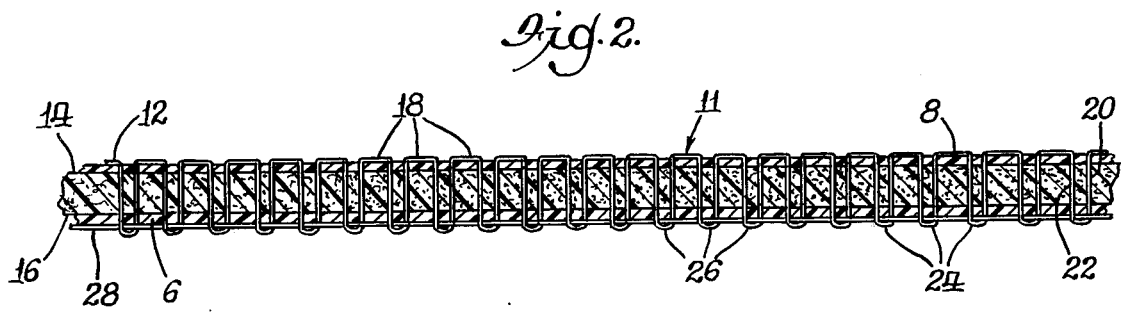
FIG. 2 is a cross sectional view taken along the line 2—2 of FIG. 1.

A high tensile strength fiber 70 is threaded through each of the apertures 64 in the same manner as described with reference to the FIG. 2 embodiment.

The flexible open-cell foam core 52 and fibrous sheets 53 and 54 define a foam core sandwich 55 which is impregnated with a settable resin containing a curing agent. The foam core sandwich 55 is then molded into a desired shape and held in this shape as the resin cures to provide a rigidized resinous foam core sandwich structure 72.

A further method of practicing the principles of my invention is to insert a plurality of high tensile strength fiber segments through a flexible open-celled foam sheet in a manner that the ends of each segment extend beyond the opposite longitudinal faces of the flexible foam sheet. The foam sheet is wetted with a settable resin in the manner described above. A pair of thin skins are placed contiguous the longitudinal faces of the flexible foam causing the ends of the high tensile strength fibers to be interposed between the thin skins and the longitudinal face of the flexible foam sheet.

After the resin cures, the opposite ends of each high tensile strength fiber will be bonded to the pair of thin skins to thereby interconnect and support the thin skin. By using a large number of such high tensile strength fiber segments, it greatly increases the amount of compression that may be applied to the resulting resinous foam core sandwich structure.

What is claimed is:

1. The method of forming a rigidized resinous foam core sandwich structure comprising:
    inserting a plurality of high tensile strength fiber segments through the opposite longitudinal faces of a flexible open-celled foam to form a series of fiber segments with ends extending beyond said longitudinal faces;
    impregnating said flexible open-celled foam with a settable resin containing a curing agent therefor;
    placing a thin plyable sheet contiguous each of the opposite longitudinal faces of a flexible open-celled foam sheet to define a foam core sandwich; and
    then molding said foam core sandwich into the desired shape and maintaining said shape while said resin cures therein whereby said ends of said plurality of fiber segments will be bonded to said plyable sheets and said plyable sheets will be bonded to said flexible foam.

2. The method according to claim 1, wherein said thin plyable sheets comprise fiber glass cloths cut to the longitudinal and width dimensions of said flexible foam.

3. The method of claim 1, wherein said inserting of said plurality of high tensile strength materials through said foam is at substantial right angles to its longitudinal faces.

4. The method of forming a rigidized resinous foam core sandwich structure comprising:
    placing a thin plyable sheet contiguous each of the opposite longitudinal faces of a flexible open-celled foam sheet;
    threading a length of high tensile strength fiber through said thin plyable sheets and through said flexible open-celled foam to form a series of fiber segments interconnecting said fibrous sheets with ends extending across the outer surface of said thin plyable sheets between two fiber segments;
    impregnating said flexible open-celled foam with a settable resin containing a curing agent therefor; and
    then molding said foam and said plyable sheets into the desired shape and maintaining said shape while said resin cures therein whereby the ends of said fiber segments are bonded to said plyable sheets and said sheets are bonded to said flexible foam.

5. The method according to claim 4, wherein said thin plyable sheets comprise fiber glass cloths cut to the longitudinal and width dimensions of said flexible foam.

6. The method of claim 4, wherein said threading through said foam is at substantial right angles to said thin plyable sheets.

7. The method of claim 5, wherein each of said fiber segments is defined by a loop of said length of fiber having two closely spaced, generally parallel leg portions extending through said flexible foam between said fibrous sheets.

8. The method of claim 7, wherein said loop of each fiber segments extends beyond one of said fibrous sheets a sufficient distance to form an aperture, and further comprising a second length of high tensile strength fiber threaded through each of said apertures prior to said resin impregnating step.

9. The method of forming a rigidized resinous foam core sandwich structure comprising:
    placing a fibrous sheet contiguous each of the opposite longitudinal faces of a flexible open-celled foam sheet;
    inserting a plurality of high tensile strength fiber segments through said fibrous sheets and through said flexible open-celled foam to form a series of fiber segments interconnecting said fibrous sheets with the ends extending beyond said fibrous sheets;
    impregnating said flexible open-celled foam and said fibrous sheets with a settable resin containing a curing agent therefor; and
    then molding said foam and said fibrous sheets into the desired shape and maintaining said shape while said resin cures therein whereby the ends of said fiber segments are bonded to said fibrous sheets and said fibrous sheets are bonded to said flexible foam.

10. The method according to claim 9, wherein said fibrous sheets comprise fiber glass cloths cut to the longitudinal and width dimensions of said flexible foam.

11. The method of claim 9 wherein said inserting through said foam is at substantial right angles to said fibrous sheets.

12. The method of claim 11, wherein each of said fiber segments is defined by a loop of said length of fiber having two closely spaced, generally parallel leg portions extending through said flexible foam between said fibrous sheets.

13. The method of claim 12, wherein said loop of each fiber segments extends beyond one of said fibrous sheets a sufficient distance to form an aperture, and further comprising a second length of high tensile strength fiber threaded through each of said apertures prior to said resin impregnating step.

14. The method of forming a rigidized resinous foam core sandwich structure comprising:
   placing a fibrous sheet contiguous each of the opposite longitudinal faces of a flexible open-celled foam sheet;
   threading a length of high tensile strength fiber through said fibrous sheets and through said flexible open-celled foam to form a continuous series of fiber segments interconnecting said fibrous sheets and define a foam core sandwich;
   impregnating said foam core sandwich with a settable resin containing a curing agent therefor; and
   then molding said foam core sandwich into the desired shape and maintaining said shape while said resin cures therein.

15. The method according to claim 14, wherein said fibrous sheets comprise fiber glass cloths cut to the longitudinal and width dimensions of said flexible foam.

16. The method of claim 15 wherein said threading through said foam is at substantial right angles to said fibrous sheets.

17. The method of claim 16, wherein each of said fiber segments is defined by a loop of said length of fiber having two closely spaced, generally parallel leg portions extending through said flexible foam between said fibrous sheets.

18. The method of claim 17, wherein said loop of each fiber segments extends beyond one of said fibrous sheets a sufficient distance to form an aperture, and further comprising a second length of high tensile strength fiber threaded through each of said apertures prior to said resin impregnating step.

19. The method of forming a rigidized resinous foam comprising:
   placing a fibrous sheet contiguous each of the opposite longitudinal faces of a flexible open-celled foam sheet;
   inserting a plurality of fiber segments through said fibrous sheets and through said flexible open-celled foam in a manner that each fiber segment defines a loop configuration having two closely spaced, generally parallel portions extending between said fibrous sheets and having the closed end portion extending beyond one of said fibrous sheets to define an aperture;
   threading a length of fiber through each of said apertures;
   impregnating said flexible open-celled foam and said fibrous sheets with a settable resin containing a curing agent therefor; and
   molding said foam and said fibrous sheets into the desired shape and maintaining said shape while said resin cures therein.

20. A reinforced rigidized resinous foam core sandwich structure comprising an open-celled flxible foam sheet, a thin plyable sheet contiguous each of the opposite longitudinal faces of said flexible foam sheet, a plurality of high tensile strength fiber segments passing through said flexible foam sheet with the end portions of said fiber segments extending beyond said opposite longitudinal faces, the cells of said flexible foam sheet being impregnated with a settable resin and curing agent therefor, and said end portions of said fiber segments being bonded to said thin plyable sheets.

21. A reinforced rigidized resinous foam core sandwich structure as defined in claim 1, wherein each of said fiber segments extend through said flexible foam sheet at substantial right angles to said opposite longitudinal faces of said flexible foam sheet.

22. A reinforced rigidized resinous foam core sandwich structure comprising an open-celled flexible foam sheet, a fibrous sheet contiguous each of the opposite longitudinal faces of said flexible foam sheet, a plurality of high tensile strength fiber segments passing through said fibrous sheets and said flexible foam sheet with the end portions of said fiber segments extending beyond said fibrous sheets, said fibrous sheets and the cells of said flexible foam being impregnated with a settable resin and curing agent therefor, and said end portions of said fiber segments being bonded to the outer faces of said fibrous sheets.

23. A reinforced rigidized resinous foam core sandwich structure as defined in claim 22, wherein each of said fiber segments extend through said foam sheet at substantial right angles to said opposite faces of said foam sheet.

24. A reinforced rigidized resinous foam core sandwich structure as defined in claim 23, wherein each of said fiber segments comprises a loop configuration having two closely spaced, generally parallel leg portions and having one of said end portions interconnecting said parallel leg portions to define an aperture, and further comprising a length of high tensile strength fiber threaded through each of said apertures, said length of high tensile strength fiber being bonded to one of said outer faces of said fibrous sheets.

25. A reinforced rigidized resinous foam core sandwich structure comprising an open-celled flexible foam sheet, a thin plyable sheet contiguous each of the opposite longitudinal faces of said flexible foam sheet, a plurality of high tensile strength fiber segments passing through said thin plyable sheets and said flexible foam sheet with the end portions of said fiber segments extending beyond said thin plyable sheets, the cells of said flexible foam being impregnated with a settable resin and curing agent therefor, and said end portions of said fiber segments being bonded to the outer faces of said thin plyable sheets.

26. A reinforced rigidized resinous foam core sandwich structure as defined in claim 25, wherein each of said fiber segments extend through said foam sheet at substantial right angles to said opposite faces of said foam sheet.

27. A reinforced rigidized resinous foam core sandwich structure as defined in claim 26, wherein each of said fiber segments comprises a loop configuration having two closely spaced, generally parallel leg portions and having one of said end portions interconnecting said parallel leg portions to define an aperture, and further comprising a length of high tensile strength fiber threaded through each of said apertures, said length of high tensile strength fiber being bonded to one of said outer faces of said thin plyable sheets.

* * * * *